July 14, 1936.                    W. W. HODGSON                    2,047,686
KEY SUPPORT
Filed Aug. 20, 1934
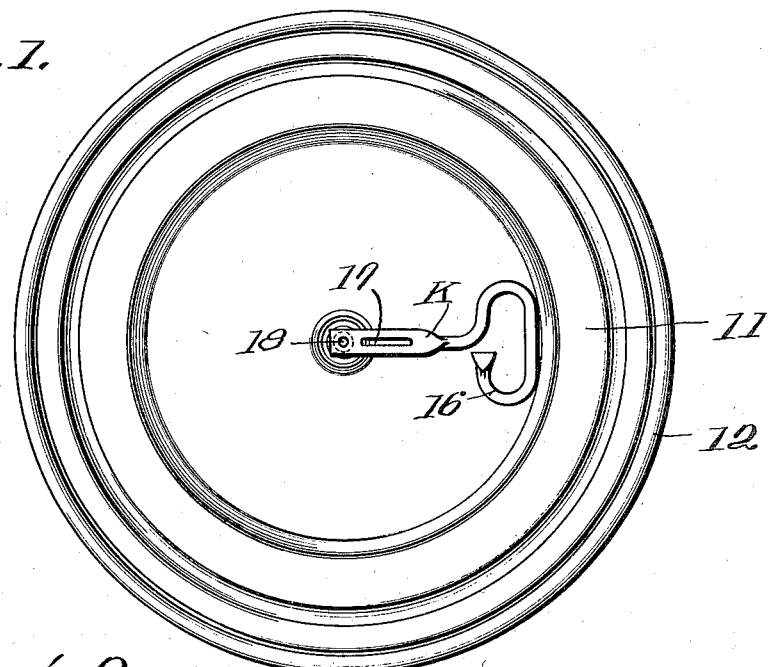
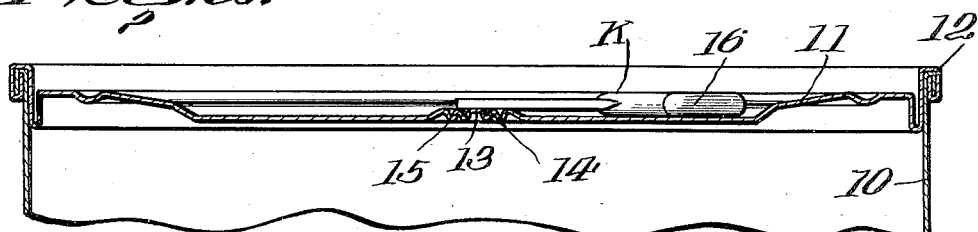
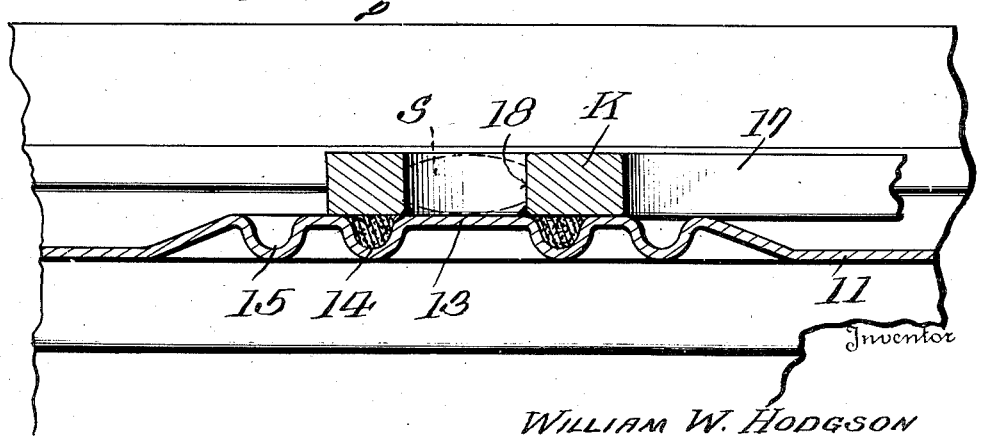
Inventor
WILLIAM W. HODGSON
By Sturtevant & Mason
Attorneys Patented July 14, 1936

2,047,686

UNITED STATES PATENT OFFICE 2,047,686

KEY SUPPORT

William W. Hodgson, Chicago, Ill., assignor to Continental Can Company, Inc., New York, N. Y., a corporation of New York Application August 20, 1934, Serial No. 740,701

1 Claim. (Cl. 220—52)

The present invention relates to container structures of the well known type including a rip strip, an opening key being provided for engaging the strip and ripping it from the rest of the container structure.

Many ways have heretofore been proposed for attaching the key to the container structure or its package, so that each container is bonded with an appropriate key.

In my prior United States Patent 1,936,018, I have described a manner of securing a key to a container structure by soldering it thereto. This arrangement is highly satisfactory in service, but I have now found that certain advantages accrue in employing a particular type of container structure and joint for attaching the key.

One of the features of the present invention is the provision of a particular type of container structure, having a key-receiving portion thereon, in combination with a key and bonding means connecting the key to such portion.

Another feature of the present invention is the provision of a container structure having a flat portion for cooperation with the key, the flat portion having a depression therein into which a bonding material may be introduced and/or received for fixing the key in position.

A further feature of the present invention is the provision of a container structure having a key-receiving portion with an endless groove therein, the key itself having a central aperture by which solder may be introduced to the abutting surfaces of the structure proper and the key, to establish a tight bond between the same, the groove operating to receive the solder and prevent its spreading widely and uselessly over the container structure.

With these and other objects in view, as will appear in the course of the following specification and claim, an illustrative form of practicing the invention is shown on the accompanying drawing, in which:

Fig. 1 is a view of an end of a container structure having an opening key fixed thereto.

Fig. 2 is a diametrical sectional view through the same, on a slightly larger scale.

Fig. 3 is an enlarged view of a fragment of Fig. 2.

In the drawing, the container is illustrated as being a sheet metal can having the body wall 10 and the end 11, these being joined by the usual double seam 12. The central portion of the end 11 is depressed to provide a pocket for receiving the key K.

In the illustrated form, a flat portion 13 is raised to receive the flattened end of the key K, so that this key will fit smoothly and flatly beneath the end plane of the container edge. A depressed portion which preferably is an endless groove 14 is provided in this flat portion, and is illustrated as of a diameter such that it is concealed by the end of the key while the key is fixed in position. A second endless groove 15 may be provided if desired. The key K has an ordinary handle portion 16, the slot 17 for engaging the free end of the rip strip, and an aperture 18.

In assembling the parts, the key K is preferably furnished with a pellet S of solder in the aperture 18 (Fig. 3) and then is laid down flat in position. A hot soldering tool is brought upon the end of the key K adjacent the aperture 18 so that the solder melts and flows downward between the key and the flat portion 13. It fills the groove 14, and upon hardening therefore operates to join the lower surface of the key K to the flat portion 13 and to the walls of the groove 14. Any excess which may exude past the key is caught by the second groove 15, although it will be understood that this is not a normal result in fixing the key.

The structure thus formed comprises the container wall with a key resting on a flat portion thereof and fixed in position by a frangible bonding material which connects the key with the wall. The securing or fixing operation is easily and quickly accomplished, without danger of wastage of solder, without possible failure of the connecting joint by a flow of the solder away from the point of attachment, and with the production of a neat finish at the point of attachment.

When the container is to be opened, the key is grasped with the fingers, or a tool inserted beneath it. The area over which the key and wall are joined is rigidly controlled by the particular structure provided, and the key is easily detached, and without leaving any obnoxious ridges or elevations of the bonding material.

It is obvious that the invention is not limited to the form of the structure shown, but that it may be employed in many ways within the scope of the appended claim.

I claim:

A key opening container including a closure end having an annular groove surrounding a flat portion, a key for opening the container having an opening therethrough of substantially the size of said flat portion, said key being adapted to overlie said annular groove when placed on the closure end with the opening in register with the flat portion, and a solder bond filling said annular groove for connecting said key to the closure end.

WILLIAM W. HODGSON.